US006395113B2

(12) United States Patent
Tomandl

(10) Patent No.: US 6,395,113 B2
(45) Date of Patent: *May 28, 2002

(54) PROCESS FOR PRODUCING A NON-COMBUSTIBLE MOULDED ARTICLE, ESPECIALLY A BUILDING PANEL

(75) Inventor: Erwin Tomandl, Wolfsbach (AT)

(73) Assignee: Thermax Brandschutzbauteile GmbH, Greinsfurth (AT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,111

(22) PCT Filed: Feb. 17, 1997

(86) PCT No.: PCT/EP97/00746

§ 371 (c)(1),
(2), (4) Date: Aug. 18, 1998

§ 102(e) Date: Aug. 18, 1998

(87) PCT Pub. No.: WO97/30951

PCT Pub. Date: Aug. 28, 1997

(30) Foreign Application Priority Data

Feb. 23, 1996 (EP) .............................. 96890026

(51) Int. Cl.[7] .............................. B32B 5/20; B32B 5/18; B29C 44/06
(52) U.S. Cl. ........................... 156/43; 264/42; 264/112; 264/118; 264/120; 264/134; 264/157; 264/259; 264/294; 264/321; 264/403; 264/460; 106/675; 106/678; 106/690; 106/691; 106/801; 106/806
(58) Field of Search ................ 106/675, 678, 106/690, 691, 801, 806; 264/402, 403, 42, 134, 157, 259, 294, 321, 460, 118, 120, 112; 156/43

(56) References Cited

U.S. PATENT DOCUMENTS

| 2,397,083 A | * | 3/1946 | Bellamy .................... 106/122 |
| 2,919,202 A | * | 12/1959 | Ekedahl et al. ............... 106/84 |
| 3,615,774 A | | 10/1971 | Criss .......................... 106/57 |
| 4,093,488 A | | 6/1978 | Kirsch et al. ................ 156/245 |
| 4,191,667 A | | 3/1980 | Wehrmann et al. .......... 260/2.3 |
| 4,201,833 A | | 5/1980 | Kirsch et al. ................ 428/404 |
| 4,395,456 A | * | 7/1983 | Jackson et al. ........... 428/304.4 |
| RE31,421 E | | 10/1983 | Wehrmann et al. ........... 521/42 |
| 4,419,133 A | * | 12/1983 | Shubow et al. .............. 106/85 |
| 4,520,073 A | * | 5/1985 | Randolph et al. ........... 428/405 |
| 4,689,249 A | * | 8/1987 | Thygesen .................... 427/180 |
| 4,981,518 A | * | 1/1991 | Sachs ........................ 106/691 |
| 5,135,805 A | * | 8/1992 | Sellers et al. ............... 428/302 |
| 5,145,627 A | | 9/1992 | Berion et al. ................ 264/113 |
| 5,264,057 A | * | 11/1993 | Schlatter et al. .............. 156/39 |
| 5,518,541 A | * | 5/1996 | Fogel et al. ................ 106/691 |
| 5,589,023 A | * | 12/1996 | Rendall et al. ............. 156/245 |
| 5,691,050 A | * | 11/1997 | Berg et al. .................. 428/344 |
| 5,879,600 A | * | 3/1999 | Symons ...................... 264/110 |
| 6,090,868 A | * | 7/2000 | Eck et al. ................... 523/212 |

FOREIGN PATENT DOCUMENTS

| AT | 327776 | 2/1976 |
| AT | 328151 | 2/1976 |
| AT | 353670 | 11/1979 |
| AU | 7256974 | 2/1976 |
| CH | 584597 | 2/1977 |
| DE | 2 410 605 | 9/1974 |
| DE | 19 20 283 | 10/1974 |
| DE | 2503920 | 8/1976 |
| DE | 2831851 | 5/1979 |
| DE | 31 02 542 A1 | 8/1982 |
| EP | 43144 | 1/1982 |
| EP | 1-0063344 | 10/1982 |
| GB | 647810 | 12/1950 |
| GB | 1325440 A | * 8/1973 ............. C02C/5/02 |

OTHER PUBLICATIONS

Utility application No. 1 944 263 filed in Germany on Jun. 29, 1966.
Data sheet by Wacker–Chemie GmbH, "Wacker Silicone Masonry Water Repellent BS 96", Munich, May 1985.
Theo Hafner, Data sheet of BBC Brown Boveri, "Manufacturing Process of Building Plates via High Frequency HF Heating".
Data sheet from leaflet by Wacker, "Silicon–Bautenschutzmittel BS 97".
Database WPI, Week 7902. Derwent Publications Ltd., London, GB; AN 79–02626B, XP002008087 & JP 53 134 814 A (Okura Industrial KK), Nov. 24, 1978.

* cited by examiner

Primary Examiner—Jan H. Silbaugh
Assistant Examiner—Michael I. Poe
(74) Attorney, Agent, or Firm—Bacon & Thomas

(57) ABSTRACT

A process is proposed for producing non-combustible moulded articles from blown vermiculite, the blown vermiculite granules being mixed with an inorganic binder and then pressed. The blown vermiculite granules are mixed with a solution of an inorganic binder, the vermiculite granules once mixed are pre-pressed, cut to the shape required and the cut blanks are pressed non-continuously at at least room temperature and preferably at temperatures of at least 100° C. and pressures of at least 0.3 N/mm² to ensure that all solvent residues are removed from the finished non-combustible moulded article.

21 Claims, No Drawings

PROCESS FOR PRODUCING A NON-COMBUSTIBLE MOULDED ARTICLE, ESPECIALLY A BUILDING PANEL

BACKGROUND OF THE INVENTION

1. Field of the Invention

The invention relates to a process for the production of nonflammable molded parts, especially building material panels, in which vermiculite granules are expanded at an elevated temperature and then mixed with a binding agent, following which a bulk material or compressed cake is formed of the granulate, which has been coated with adhesive, and it is pressed into a nonflammable molded part.

2. Description of Related Art

In the production of nonflammable molded parts, it is known how to coat expanded materials such as vermiculite, perlite, or light expanded clay aggregate with binding agents comprised of inorganic and organic components, and then to compress them so that a connection of the expanded material particles to each other arises. Due to the fact that condensation resins, such as formaldehyde condensation resins, for example, are used as organic components, it has been shown that, due to the processing parameters during the compression procedure, compounds of these resins that have a low molecular weight, such as formaldehyde, are liberated. As a result, these well-known methods have proven to be a relatively large source of environmental pollution.

Now it is the task of the invention to indicate a process of the type mentioned at the outset for the production of nonflammable molded parts that is environmentally friendly and yields satisfactory properties at the end product of the process, such as its mechanical stability and absence of flammability.

SUMMARY OF THE INVENTION

According to the invention, therefore, a process of the type mentioned at the outset is proposed, which is characterized by the fact that the expanded vermiculite granulate is furnished with an application of an adhesive coating comprised of a solution of an inorganic binding agent, and that the coated vermiculite granulate is precompressed, continuously or discontinuously, cut to the shape of the individual piece, and that these custom-cut pieces are compressed discontinuously at room temperature or higher, preferably at temperatures of at least 100° C., and at pressures of at least 0.3 N/mm², so that all solvent residues are removed from the final, finished, nonflammable molded part.

An advantage of the process according to the invention resides in the fact that the discontinuous hot compression occurs in a press that is heated by the usual heating media, and by means of high-frequency current as well. Furthermore, the discontinuous hot compression occurs, to good advantage, in the presence of a steam sieve for the purpose of removing solvent residues. Similarly, in the case of the continuous precompression, cover sheets arranged on one or both sides of the bulk cake can be compressed with the cake to good effect.

In the process according to the invention, a binding agent that contains phosphorus is used to good advantage as an inorganic binding agent, such that those that are based upon acids that contain phosphorus, and/or their salts, are particularly well-suited.

Furthermore, silicate compounds can be used to good effect as inorganic binding agents, preferably silicate of potassium or sodium, hydraulic binders, preferably cement, Sorel binders, as well as hemihydratic or hydratic binders, such as gypsum. Other additives, preferably agents that render the solution hydrophobic, may be added to the solution of inorganic binding agents as well.

DETAILED DESCRIPTION OF THE PREFERRED EMBODIMENT

The invention will now be illustrated in greater detail by virtue of an embodiment example:

In a rotary kiln, the vermiculite granulate is expanded at a temperature of ca. 850° C. The expanded vermiculite granulate is then placed into a mixing unit, in which it is mixed with the binding agent solution, which is added by means of a dosage apparatus. The binding agent solution consists, for example, of aqueous ortho-phosphoric acid, which contains, in addition, hydrophobizing agents that are based upon organo-silicon compounds. The dosage is controlled in such a manner that the quantity of binding agent in the finished panel amounts to about 10% by weight.

The mixture that is removed from the mixing unit, which has been given an adhesive coating of binding agent, is now transferred to a dispersion hopper or a dispersion station, in which a bulk load of uniform height is formed. This bulk load is then transported to a preliminary compression unit in which it undergoes precompression to about 50% of the original bulk load's height. Covering sheets, such as decorative sheets, can be applied to both sides of the bulk cake. After the preliminary compression, the blank that has undergone preliminary compression is cut into large panels and transferred discontinuously to a press that can be heated with high-frequency current and heating oil, in which the panels are compressed at a temperature of 200° C. and a compression pressure of 1 N/mm². A cross-linking of the phosphoric acid, with a loss of water, occurs as a result of the elevated temperature. This water from the reaction, as well as any solvent residues that may be present, can be removed by means of a steam sieve that is applied within the press. As a result of this measure, irregularities in the surface of the panel can be avoided. The finished pressed panel is now separated from the pressure panel and cooled. Then the panels are cut to the desired format and stacked.

The nonflammable molded parts that are manufactured according to the invention can be used, for example, in machine building and in the construction industry.

What is claimed is:

1. In a process for the production of a nonflammable molded part in which vermiculite granulate is expanded at an elevated temperature and then mixed with a binding agent, following which a bulk load of a compressed cake is formed of the granulate that has been coated with adhesive and pressed into a nonflammable molded part, wherein a coating of adhesive solution of an inorganic binding agent is applied to the expanded vermiculite granulate, that the expanded vermiculite granulate that is furnished with the adhesive coating is then subjected to preliminary compression, continuously or discontinuously, and further custom cut and that these custom-cut parts undergo discontinuous compression at room temperature or higher, and pressures of at least 0.3 N/mm², so that all solvent residues are removed from the finished, nonflammable molded part;

wherein the improvement comprises the selection of said solution of inorganic binding agent with the proviso that said inorganic binding agent of said solution consists of an inorganic compound based on acids that contain phosphorus and/or their salts and said solution of inorganic binding agent includes a hydrophobizing agent based on an organo-silicon compound.

2. The process of claim 1 wherein said nonflammable molded part is a building material panel.

3. The process of claim 1 wherein said custom-cut parts undergo discontinuous compression at temperatures of at least 100° C.

4. The process according to claim 3 wherein the inorganic phosphorus-containing binder is selected from the group consisting of phosphorus-containing acids and phosphorus-containing acid salts.

5. The process according to claim 3 wherein in the case of the continuous preliminary compression, covering sheets are provided on one or both sides and are compressed as well.

6. The process according to claim 5 wherein the inorganic phosphorus-containing binder is selected from the group consisting of phosphorus-containing acids and phosphorus-containing acid salts.

7. The process according to claim 3, wherein the discontinuous hot compression occurs in the presence of a steam sieve in order to remove solvent residues.

8. The process according to claim 7 wherein the inorganic phosphorus-containing binder is selected from the group consisting of phosphorus-containing acids and phosphorus-containing acid salts.

9. The process according to claim 7 wherein in the case of the continuous preliminary compression, covering sheets are provided on one or both sides and are compressed as well.

10. The process according to claim 9 wherein the inorganic phosphorus-containing binder is selected from the group consisting of phosphorus-containing acids and phosphorus-containing acid salts.

11. The process according to claim 3, wherein the discontinuous hot compression occurs in a heated press and in addition by means of high-frequency current.

12. The process according to claim 11 wherein the inorganic phosphorus-containing binder is selected from the group consisting of phosphorus-containing acids and phosphorus-containing acid salts.

13. The process according to claim 11 wherein in the case of the continuous preliminary compression, covering sheets are provided on one or both sides and are compressed as well.

14. The process according to claim 13 wherein the inorganic phosphorus-containing binder is selected from the group consisting of phosphorus-containing acids and phosphorus-containing acid salts.

15. The process according to claim 11, wherein the discontinuous hot compression occurs in the presence of a steam sieve in order to remove solvent residues.

16. The process according to claim 15 wherein the inorganic phosphorus-containing binder is selected from the group consisting of phosphorus-containing acids and phosphorus-containing acid salts.

17. The process according to claim 15 wherein in the case of the continuous preliminary compression, covering sheets are provided on one or both sides and are compressed as well.

18. The process according to claim 17 wherein the inorganic phosphorus-containing binder is selected from the group consisting of phosphorus-containing acids and phosphorus-containing acid salts.

19. In a process for producing a nonflammable molded part which comprises:

coating expanded vermiculite granulate with a solution of an inorganic binding agent to form a bulk cake of expanded vermiculite granulate coated with said binding agent, said bulk cake having two sides;

continuously or discontinuously precompressing said bulk cake to form a compressed cake;

cutting said compressed cake into individual pieces;

compressing said individual pieces discontinuously to form said nonflammable molded part, said compressing of said individual pieces being performed at room temperature or higher and at a pressure of at least 0.3 $N/mm^2$, whereby solvent residue is removed from said nonflammable molded part;

wherein the improvement comprises the selection of said solution of inorganic binding agent with the proviso that said inorganic binding agent of said solution consists of an inorganic compound based on acids that contain phosphorus and/or their salts and said solution of inorganic binding agent includes a hydrophobizing agent based on an organo-silicon compound.

20. The method of claim 19 wherein said individual pieces are compressed at a temperature of at least 100° C.

21. The method of claim 20 wherein a cover sheet is applied to one or both sides of said bulk cake so that said cover sheet on one or both sides of said bulk cake are precompressed therewith.

* * * * *